United States Patent
Srinivasan et al.

(10) Patent No.: US 9,832,143 B2
(45) Date of Patent: *Nov. 28, 2017

(54) SYSTEM AND METHOD FOR SUPPORTING EFFICIENT VIRTUAL OUTPUT QUEUE (VOQ) PACKET FLUSHING SCHEME IN A NETWORKING DEVICE

(71) Applicant: Oracle International Corporation, Redwood Shores, CA (US)

(72) Inventors: Arvind Srinivasan, San Jose, CA (US); Carlos Castil, Mountain View, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,831

(22) Filed: Dec. 29, 2014

(65) Prior Publication Data
US 2016/0191422 A1 Jun. 30, 2016

(51) Int. Cl.
*H04L 12/861* (2013.01)
*H04L 12/931* (2013.01)
(Continued)

(52) U.S. Cl.
CPC .......... *H04L 49/3045* (2013.01); *H04L 47/50* (2013.01); *H04L 49/101* (2013.01); *H04L 49/201* (2013.01); *H04L 49/9084* (2013.01)

(58) Field of Classification Search
CPC .............. H04L 49/3045; H04L 49/201; H04L 49/9084; H04L 47/50; H04L 49/101
See application file for complete search history.

(56) References Cited

U.S. PATENT DOCUMENTS 6,611,527 B1 8/2003 Moriwaki
6,789,118 B1 * 9/2004 Rao ..................... H04L 12/5695
370/230
(Continued)

FOREIGN PATENT DOCUMENTS

EP 1117213 7/2001
EP 2134037 12/2009

OTHER PUBLICATIONS

European Patent Office, International Searching Authority, International Search Report and Written Opinion for International Patent Application No. PCT/US2015/063521, 18 pages.
(Continued)

*Primary Examiner* — Ayaz Sheikh
*Assistant Examiner* — Debebe Asefa
(74) *Attorney, Agent, or Firm* — Tucker Ellis LLP

(57) ABSTRACT

A system and method can support packet switching in a network environment. The system can include an ingress buffer on a networking device, wherein the ingress buffer, which includes one or more virtual output queues, operate to store one or more incoming packets that are received at an input port on the networking device. Furthermore, the system can include a packet flush engine, which is associated with the ingress buffer, wherein said packet flush engine operates to flush a packet that is stored in a said virtual output queue in the ingress buffer, and notify one or more output schedulers that the packet is flushed, wherein each output scheduler is associated with an output port.

20 Claims, 6 Drawing Sheets

(51) Int. Cl.
*H04L 12/863* (2013.01)
*H04L 12/933* (2013.01)
*H04L 12/935* (2013.01)

(56) References Cited

U.S. PATENT DOCUMENTS

| | | | |
|---|---|---|---|
| 7,058,053 B1 | 6/2006 | Schober | |
| 7,194,661 B1 | 3/2007 | Payson | |
| 7,295,563 B2* | 11/2007 | Hughes | H04L 45/30 |
| | | | 370/235 |
| 7,391,786 B1 | 6/2008 | Prasad | |
| 7,729,247 B2 | 6/2010 | Kim | |
| 7,792,098 B2 | 9/2010 | Garmire | |
| 7,830,793 B2 | 11/2010 | Gai | |
| 8,391,302 B1 | 3/2013 | Kommidi | |
| 9,262,356 B2* | 2/2016 | Sonntag | G06F 13/362 |
| 9,294,402 B2* | 3/2016 | Yamaguchi | H04L 49/109 |
| 2003/0223416 A1 | 12/2003 | Rojas | |
| 2005/0036502 A1 | 2/2005 | Blanc | |
| 2005/0076166 A1 | 4/2005 | Shearer | |
| 2005/0088969 A1 | 4/2005 | Carlsen | |
| 2005/0226146 A1 | 10/2005 | Rider | |
| 2006/0098681 A1 | 5/2006 | Cafiero | |
| 2008/0291825 A1 | 11/2008 | Kendall | |
| 2013/0064068 A1* | 3/2013 | Kamath | H04L 41/0668 |
| | | | 370/222 |
| 2014/0120771 A1 | 5/2014 | Tai | |
| 2014/0173163 A1 | 6/2014 | Kitahara | |

OTHER PUBLICATIONS

U.S, Office Action dated July 25, 2016 for U.S. Appl. No. 14/584,824, 18 Pages.
U.S., Office Action dated July 27, 2016 for U.S. Appl. No. 14/584,816, 15 Pages.
European Patent Office, International Searching Authority, International Search Report and Written Opinion dated Mar. 21, 2016 for International Patent No. PCT/US2015/063520, 12 pages.
U.S., Office Action dated Apr. 8, 2016 for U.S. Appl. No. 14/584,847, 10 pages.
European Patent Office, International Searching Authority, Communication Relating to the Results of the Partial International Search, Annex to Form PCT/ISA/206 dated Mar. 14, 2016 for International Patent Application No. PCT/US2015/063521, 4 pages.

* cited by examiner

SYSTEM AND METHOD FOR SUPPORTING EFFICIENT VIRTUAL OUTPUT QUEUE (VOQ) PACKET FLUSHING SCHEME IN A NETWORKING DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent applications, each of which is hereby incorporated by reference in its entirety:

U.S. patent application Ser. No. 14/584,816, filed Dec. 29, 2014, entitled "SYSTEM AND METHOD FOR SUPPORTING EFFICIENT VIRTUAL OUTPUT QUEUE (VOQ) RESOURCE UTILIZATION IN A NETWORKING DEVICE";

U.S. patent application Ser. No. 14/584,824, filed Dec. 29, 2014, entitled "SYSTEM AND METHOD FOR SUPPORTING CREDIT MANAGEMENT FOR OUTPUT PORTS IN A NETWORKING DEVICE"; and U.S. patent application Ser. No. 14/584,847, filed Dec. 29, 2014, entitled "SYSTEM AND METHOD FOR SUPPORTING BUFFER REALLOCATION IN A NETWORKING DEVICE".

FIELD OF INVENTION

The present invention is generally related to computer systems, and is particularly related to a high performance system in a cloud environment.

BACKGROUND

As larger cloud computing architectures are introduced, the performance and administrative bottlenecks associated with the traditional network and storage have become a significant problem. An engineered system, such as the Oracle engineered system, can provide excellent processing speeds, significantly faster deployments, instant visuals for in-depth analysis, and manageable big data capability. This is the general area that embodiments of the invention are intended to address.

SUMMARY

Described herein are systems and methods that can support packet switching in a network environment. The system can include an ingress buffer on a networking device, wherein the ingress buffer, which includes one or more virtual output queues, operate to store one or more incoming packets that are received at an input port on the networking device. Furthermore, the system can include a packet flush engine, which is associated with the ingress buffer, wherein said packet flush engine operates to flush a packet that is stored in a said virtual output queue in the ingress buffer, and notify one or more output schedulers that the packet is flushed, wherein each output scheduler is associated with an output port.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the InfiniBand (IB) network switch as an example for a high performance networking device. It will be apparent to those skilled in the art that other types of high performance networking devices can be used without limitation.

Described herein are systems and methods that can support packet switching in a network environment, such as a cloud environment.

High Performance System

Figure 1:
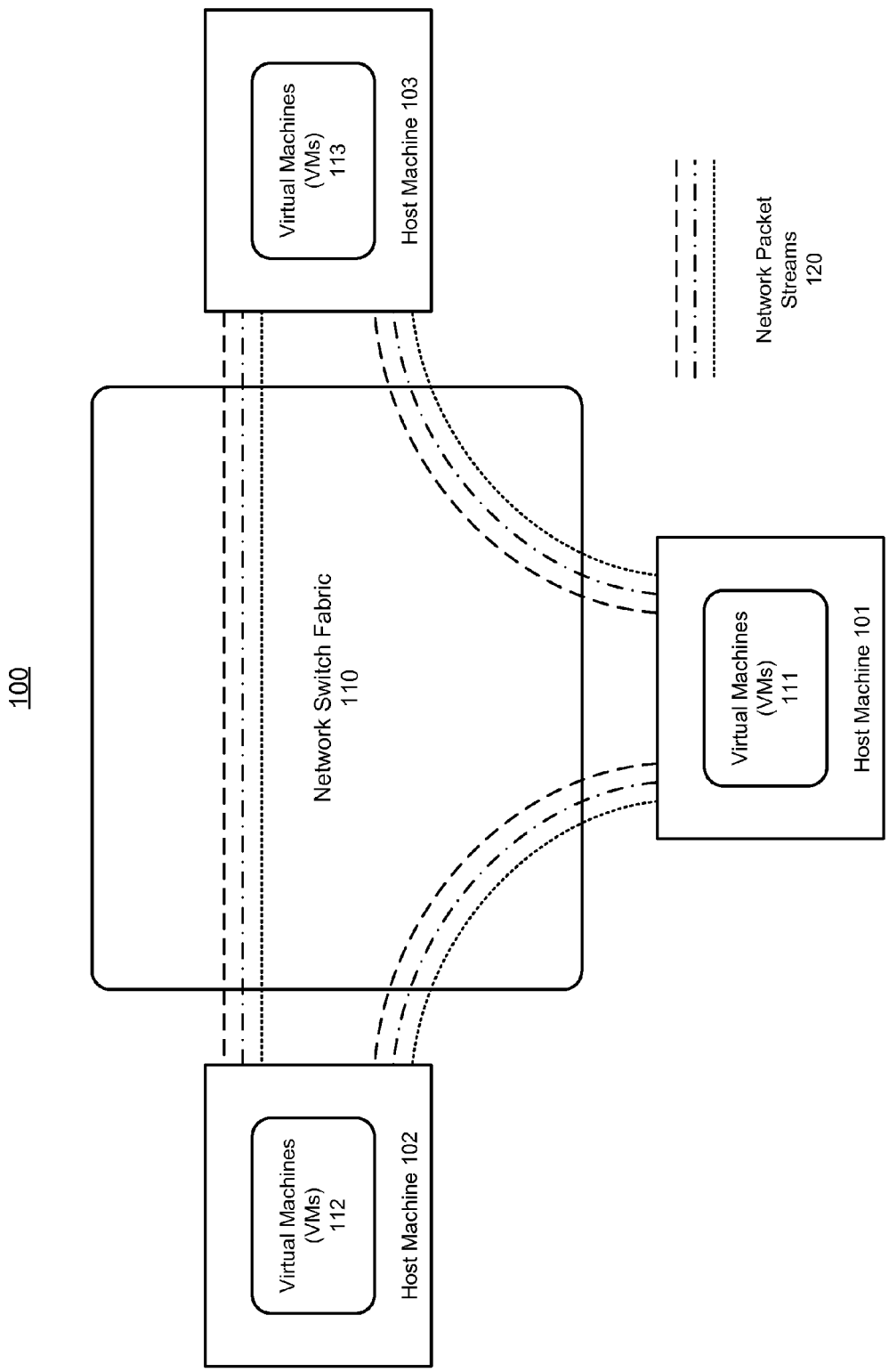
FIG. 1 shows an illustration of supporting a high performance system in a network environment, in accordance with an embodiment of the invention.

FIG. 1 shows an illustration of supporting a high performance system in a network environment, in accordance with an embodiment of the invention. As shown in FIG. 1, a high performance system 100 can include a plurality of host machines 101-103 (or servers) that are interconnected via a network switch fabric 110.

The network switch fabric 110 in the high performance system 100 can be responsible for directing the traffic movement between various virtual machines (VMs) 111-113 (and/or virtualized applications) that are running on the various host machines 101-103.

In accordance with an embodiment of the invention, the network switch fabric 110 can be based on the InfiniBand (IB) protocol, which can manage the peer-to-peer credit exchanges and provides lossless end-to-end connectivity. Thus, various networking devices in the network switch fabric 110 can maintain credit consistency under different conditions for supporting the data transfer in the high performance system 100.

Additionally, each physical IB link can be divided into multiple virtual link (VLs) in order to provide quality of service (QoS) for traffic between various VMs 111-113 (and/or applications). For example, the network packet streams 120 between the host machines 101-103 can represent an aggregation of different services that the different VMs 111-113 and applications may desire. Furthermore, the individual packet streams 120, which are transmitted within the aggregated network pipes between the different source and destination pairs, can meet different service requirements (or even conflicting service requirements).

InfiniBand (IB) Network Switch

Figure 2:
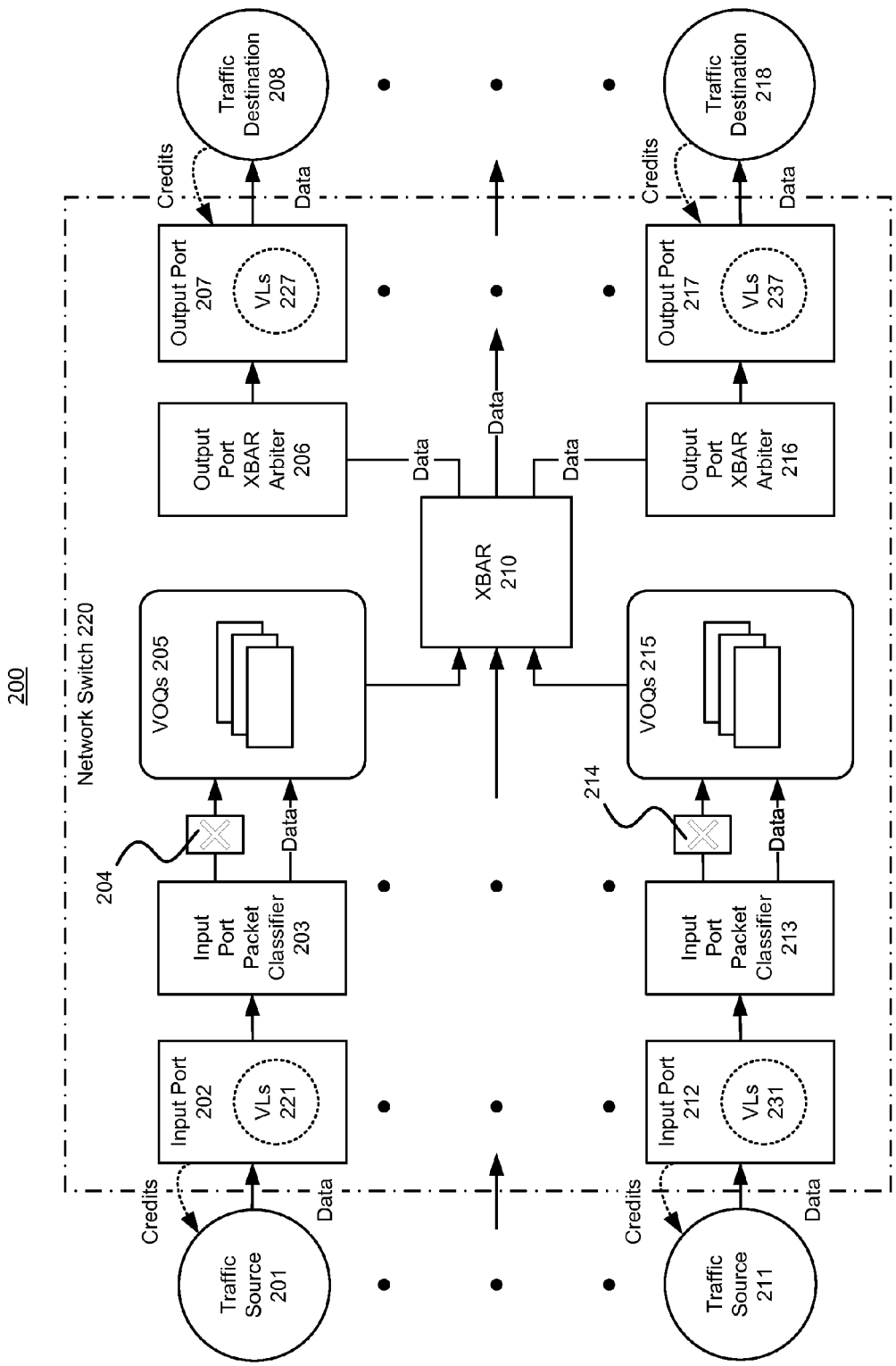
FIG. 2 shows an illustration of supporting a network switch in a high performance system, in accordance with an embodiment of the invention.

FIG. 2 shows an illustration of supporting a network switch in a high performance system, in accordance with an embodiment of the invention. As shown in FIG. 2, a network device, such as an IB network switch 220 in a high performance system 200, can be responsible for directing data traffic from various traffic sources 201 and 211 to various traffic destinations 208 and 218.

For example, the IB network switch 220, which supports a large number of ports, such as the input ports 202 and 212 and the output ports 207 and 217, can be based on a crossbar (XBAR) fabric 210.

As shown in FIG. 2, the input port 202 can receive various incoming data packets from the traffic source 201 using the source VLs 221, and the input port 212 can receive various data packets from the traffic source 211 using the source VLs 231. Also, the output port 207 can send outgoing data packets to the traffic destination 208 using the destination VLs 227, and the output port 217 can send outgoing data packets to the traffic destination 218 using the destination VLs 237.

Furthermore, the IB switch 220 can meet the different QoS demands, which supports the optimal usages of available network fabric resources. For example, the IB switch 220 may re-map an incoming VL for a packet (i.e. a source VL) to a different outgoing VL for the packet (i.e. a destination VL), based on the service levels (SL) of the traffic that is associated with an application.

In accordance with an embodiment of the invention, each of the input ports 202 or 212 can take advantage of an input port packet classifier 203 or 213, which can determine an output port for each incoming packet. For example, the input port packet classifiers 203 can determine an output port for each packet received at the input port 202 (and can use a port filter 204 to remove one or more packets), and the input port packet classifiers 213 can determine an output port for each packet received at the input port 212 (and can use a port filter 214 to remove one or more packets).

Additionally, the input port packet classifier 203 or 213 can determine multiple output destination ports for each multi-destination packet (such as for multicasting and broadcasting) that arrives at the input ports 202 or 212. The port filter 204 or 214 can remove one or more destination ports from the port list for the given packet. Furthermore, a multi-destination packet may be dropped if all the destination ports are removed from the list. Otherwise, the packet can be queued for the available destination ports, which can be a subset of the originally classified port list (by the input port packet classifier 203 or 213).

On per input port basis, the input port 202 or 212 can store the received packets in an ingress buffer, e.g. the virtual output queues (VOQs) 205 or 215, before transmitting the received packets to a traffic destination 208 or 218 (e.g. via an output port 207 or 217). As shown in FIG. 2, the packets received at the input port 202 can be stored in the VOQs 205 and the packets received at the input port 212 can be stored in the VOQs 215.

Additionally, each of the ingress buffers (e.g. the VOQs 205 or 215) may include a number of queues, each of which can be responsible for handling packets targeting a destination VL associated with an output port (e.g. the VLs 227 on the output port 207 and the VLs 237 on the output port 217).

Thus, the total number of the queues on per input port basis can be the product of the number of the output ports and the number of the destination VLs supported on each output port. As a result, the system may require a large number of queues for each input port 202 or 212, if the number of ports and the number of VLs supported on each port are large.

In accordance with an embodiment of the invention, the VOQs 205 and 215 can be implemented using a shared memory structure, and the utilization of each queue in the VOQs 205 and 215 can be traffic dependent. For example, a VOQ resource can represent the number of the memory blocks, which are consumed when an incoming packet is queued (i.e. the receipt of a network packet) and eventually freed up when the packet is de-queued (i.e. the delivery of the packet to an output port). Thus, the utilization of the VOQ resource can be a function of the traffic patterns.

In accordance with an embodiment of the invention, the system can schedule the input ports 202 and 212 and direct the movement of the packets stored in the VOQs 205 and 215 toward the output ports 207 and 217. The drain rate of each queue in the ingress buffer may depend on the destination VLs and the output ports that the packets target.

As shown in FIG. 2, each output port 207 or 217 can take advantage of an output scheduler (such as an output port XBAR arbiter 206 or 216). The output port XBAR arbiter 206 or 216 can make decision that are relate to the packet movement based on various criteria, such as the fullness of various VOQs and the available credits on the destination VLs.

In accordance with an embodiment of the invention, the IB network switch 220 can maintain credit consistency under different conditions. As shown in FIG. 2, on the receive side of the IB network switch 220, the credits can be maintained consistent based on the incoming source VLs 221 and 231 of the incoming packets; and on the transmit side of the IB network switch 220, the credits can be maintained consistent based on the destination VLs 227 and 237 of the outgoing packets.

Furthermore, on per input port basis, the queuing of each incoming packet can be performed based on the source VL of the packet. Thus, the system can perform various credit accounting operations based on the source VLs 221 or 231. For example, for the purpose of credit accounting, a VOQ set can be assigned to each source VL in the IB network switch 220.

Managing VOQ Resource

In accordance with an embodiment of the invention, the system can provide a framework for managing VOQ resources under different conditions (such as error handling, link state change, and buffer reallocation).

Figure 3:
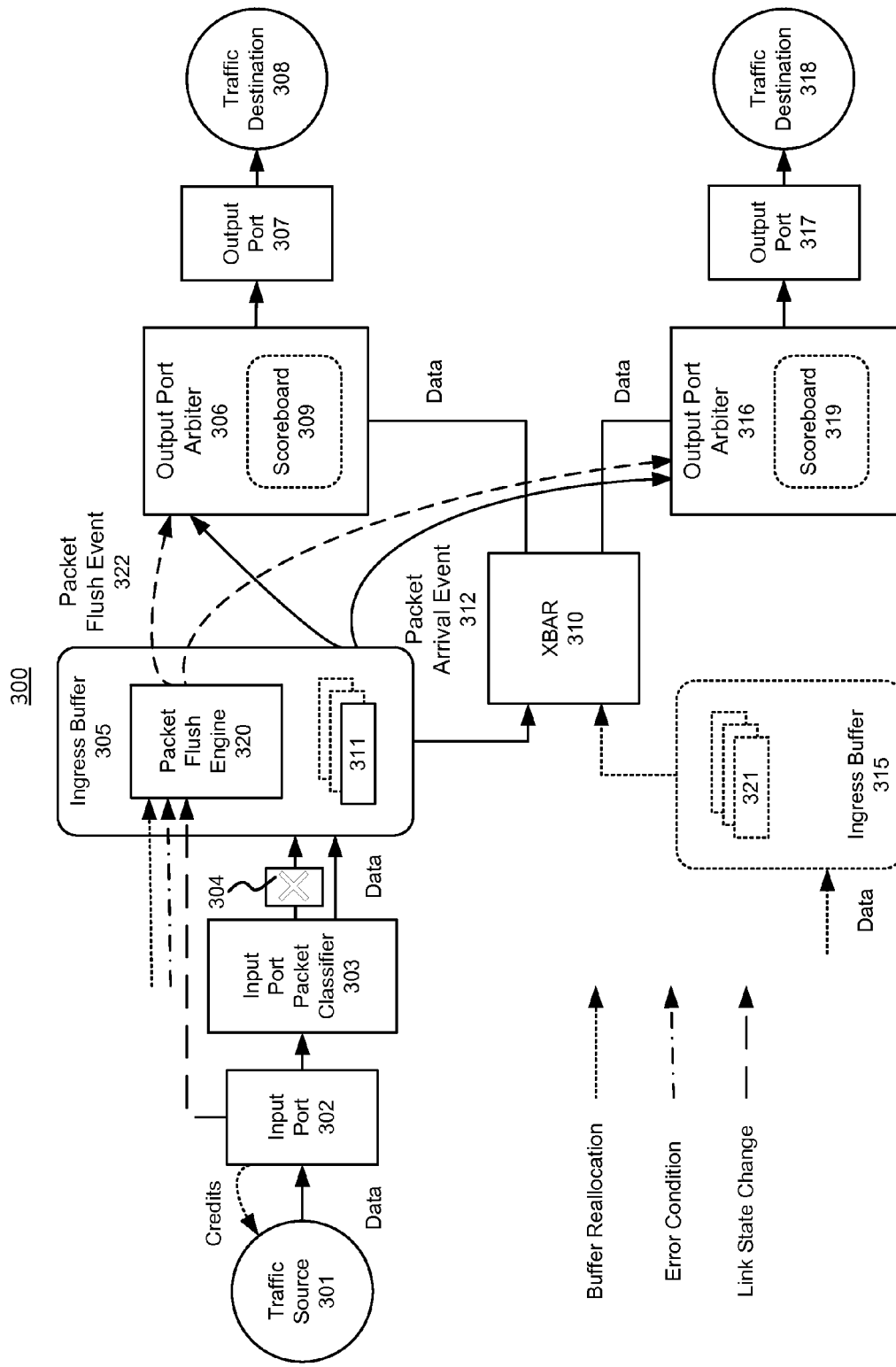
FIG. 3 shows an illustration of managing virtual output queue (VOQ) resources in a high performance system, in accordance with an embodiment of the invention.

FIG. 3 shows an illustration of managing VOQ resources in a high performance system, in accordance with an embodiment of the invention. As shown in FIG. 3, an input port 302 in an IB network switch 300 can advertise one or more credits to and receives one or more data packets from a remote sender, such as a traffic source 301.

The input port 302 can take advantage of an input packet classifier 303, which can determine one or more destinations (e.g. an output port 307 or 317) for each incoming packet (and can use a port filter 304 to remove one or more packets). Furthermore, the input port 302 can store the received packets in an ingress buffer 305, which includes a set of VOQs, before forwarding the packets to the different remote receivers (such as the traffic destination 308 and 318), via the crossbar (XBAR) fabric 310.

As shown in FIG. 3, a VOQ 311 in the ingress buffer 305 is associated with a packet flush engine 320, which provides an abstraction layer on top of a low level process that flushes the packets (including managing various types of events for flushing the packets). Also, a VOQ 321 in the ingress buffer 315 can be associated with a different packet flush engine (not shown).

For example, a packet stored in the VOQ 311 can spawn multiple buffers, which can be chained as a linked list. The packet flush engine 320, which is based on a hierarchical process, can walk through the linked list of buffers from the head of a VOQ 311 and de-queues the linked list of buffers one by one. Once the entire packet is freed from the VOQ 311, the packet flush engine 320 can notify various output ports 307 and 317 (e.g. by announcing a packet flush event 322 to the output port arbiters 306 and 316).

Additionally, when a multicast packet is to be de-queued from the ingress buffer 305, the multicast packet needs to be enqueued into and de-queued from the various VOQs in the destination list sequentially. Thus, the packet flush engine 320 may not free the buffers in the VOQ 311 until the multicast packet is de-queued from the last VOQ, which is a part of the destination list.

In accordance with an embodiment of the invention, the system can provide an abstraction to various output schedulers, such as the output port arbiters 306 and 316, so that the output port arbiters 306 and 316 can be agnostic to the different conditions behind the changes in the VOQ resources. For example, the of VOQ resources may be reclaimed for handling the various error conditions, such as the head of lifetime limit (HLL) timeout expiration, and various link state changes.

In order to provide non-blocking behavior (among ports and associated VLs), the reclamation of the VOQ resources on a single input port 302 can be performed in conjunction with the different output schedulers (such as the output arbiters 306 and 316 that has traffic scheduled from the input port 302). Thus, the abstraction can keep the output port arbiters 306 and 316 and the VOQs in the ingress buffer 305 in synchronization.

As shown in FIG. 3, when a packet arrives, the ingress buffer 305 can enqueue the packet into the buffers in the ingress buffer 305 (e.g. in the VOQ 311), and notifies various output ports 307 and 317 (e.g. by announcing a packet arrival event 312 to the output port arbiters 306 and 316).

Furthermore, the output port arbiters 306 or 316 can update its own records accordingly. For example, the output port arbiter 306 can increment the packet counts (or lengths) in the scoreboard 309, and the output port arbiter 316 can increment the packet counts (or lengths) in the scoreboard 319. Later on, after a packet is scheduled and has moved through the crossbar 310 fabric, the output schedulers 306 and 316 can modify the scoreboards again, e.g. by decrementing the packet counts (or lengths) in the scoreboard 309 or 319).

On the other hand, when a packet is flushed (or removed), the ingress buffer 305 (e.g. the VOQ 311) can de-queue the packet from its buffers and notifies various output ports 307 and 317 (e.g. by announcing a packet flush event 322 to the output port arbiters 306 and 316). Then, the output port 307 or 317 can decrement the packet counts (or lengths) from the scoreboards 309 or 319 (or modifies the contents in the scoreboard 309 or 319 accordingly).

In accordance with an embodiment of the invention, the system can handle and recover from various error conditions, such as a HLL expiration condition, using the above abstraction. For example, the HLL expiration can occur when an output port is starved for an extended period of time. Also, the HLL expiration can happen after the congestion on an upstream port and/or the stalling of VLs have has occurred for an extended period of time.

In order to handle the HLL expiration, the system can delete the stalled packets from the head of the VOQ in a graceful manner without blocking other VOQs and ports. For supporting the HLL reporting, a packet, which is deleted for handling the HLL expiration, can have a footprint involving various packet statistics and can consume only necessary buffer credits that are associated with various required logics.

Furthermore, a repeated HLL expiration can disable the queue completely and may result in the entire VOQ being flushed. For example, the system can perform the packet flush operation recursively by using the packet flush engine 320 repeatedly.

Additionally, the system can handle the HLL expiration in conjunction with multicast replications. In the hardware based multicast replication, the HLL based packet flushing can be supported on a per VOQ basis. Furthermore, the packets can be de-queued from one VOQ and enqueued into another VOQ, after an output port in the destination list is serviced. The system can take advantage of the above abstraction, which ignores the type of packet that is presented in the queue. Thus, the multicast packets can be handled in the same manner as the unicast packets are handled.

In accordance with an embodiment of the invention, the system can provide a set of timers (such as the HLL timers) for each VOQ. For example, the timers, which can check how long a packet has been staged at the head of a queue, may start every time when a new packet is inserted to the head of the queue.

If the timer expires before the packet is scheduled for transmission toward an output port, the system can mark the packet as to be deleted and can use the packet flush engine 320 to flush the packet. On the other hand, if the packet is scheduled for transmission before the timer expires, then the timers can be reset and wait for the arrival of the next packet.

In accordance with an embodiment of the invention, the system can handle various link state changes, using the above abstraction.

As shown in FIG. 3, an input port 302 can store received packets in an ingress buffer 305, and multiple output ports 307 and 317 can be served by the same input port 302. When an ingress link associated with the input port 302 goes up and down, stale data may be presented in the ingress buffer 305 (e.g. when an output port is stalled for an extended period of time before the ingress link comes back up).

Furthermore, various link level parameters, such as the operational VLs (e.g. the number of VLs supported) and their initial credit allocation (e.g. port MTU etc.), may change when the link state on the input port 302 changes, since these link level parameters may be tightly coupled to how the VOQs are set up for operation.

In order to handle the various link state changes, the system can use the packet flush engine 320 to flush out stale packets that are presented in the VOQs. For example, the flush operation can be performed by momentarily reducing the timers to a small value. Additionally, the packet flush operation can be performed recursively across all VOQs, until the ingress buffer 305 become completely empty. Thus, the system can make sure that the ingress buffer 305 (or VOQs) do not have stale data presented.

Additionally, when a link state change occurs at the input port 302, a multicast packet can be flushed each time after it is moved into a new VOQ in the destination list. Also, the enqueuing operation and the flushing operation can be performed sequentially, in order to keep the output port arbiters 306 and 326 and the VOQs in the ingress buffer 305 in synchronization.

Figure 4:
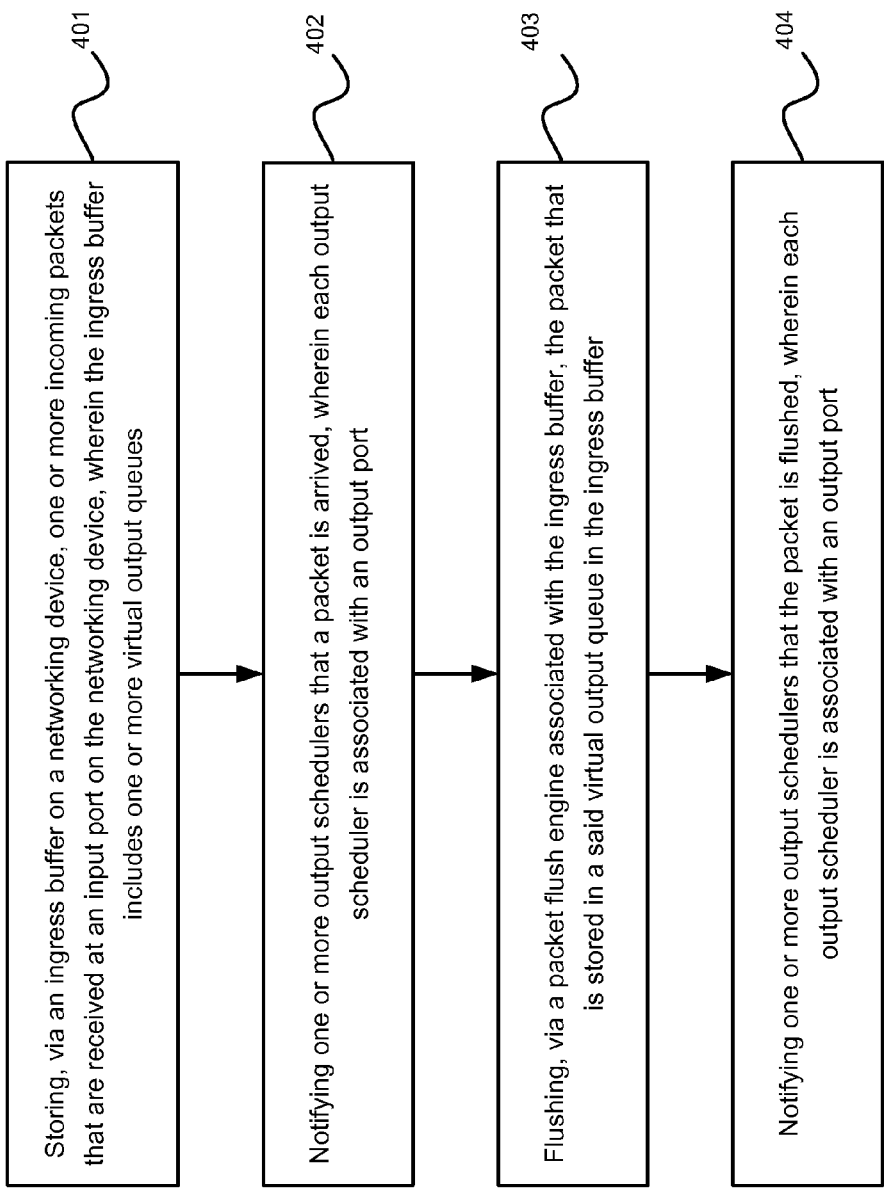
FIG. 4 illustrates an exemplary flow chart for managing virtual output queue (VOQ) resources in a high performance system, in accordance with an embodiment of the invention.

FIG. 4 illustrates an exemplary flow chart for managing VOQ resources in a high performance system, in accordance with an embodiment of the invention. As shown in FIG. 4, at step 401, an ingress buffer on a networking device can store one or more incoming packets that are received at an input port on the networking device, wherein the ingress buffer includes one or more virtual output queues. Furthermore, at step 402, the system can notify one or more output schedulers that the packet has arrived, wherein each output scheduler is associated with an output port. Then, at step 403, a packet flush engine associated with the ingress buffer can flush a packet that is stored in a said virtual output queue in the ingress buffer. Additionally, at step 404, the system can notify one or more output schedulers that the packet is flushed, wherein each output scheduler is associated with an output port.

Live Reallocation of Buffers

Figure 5:
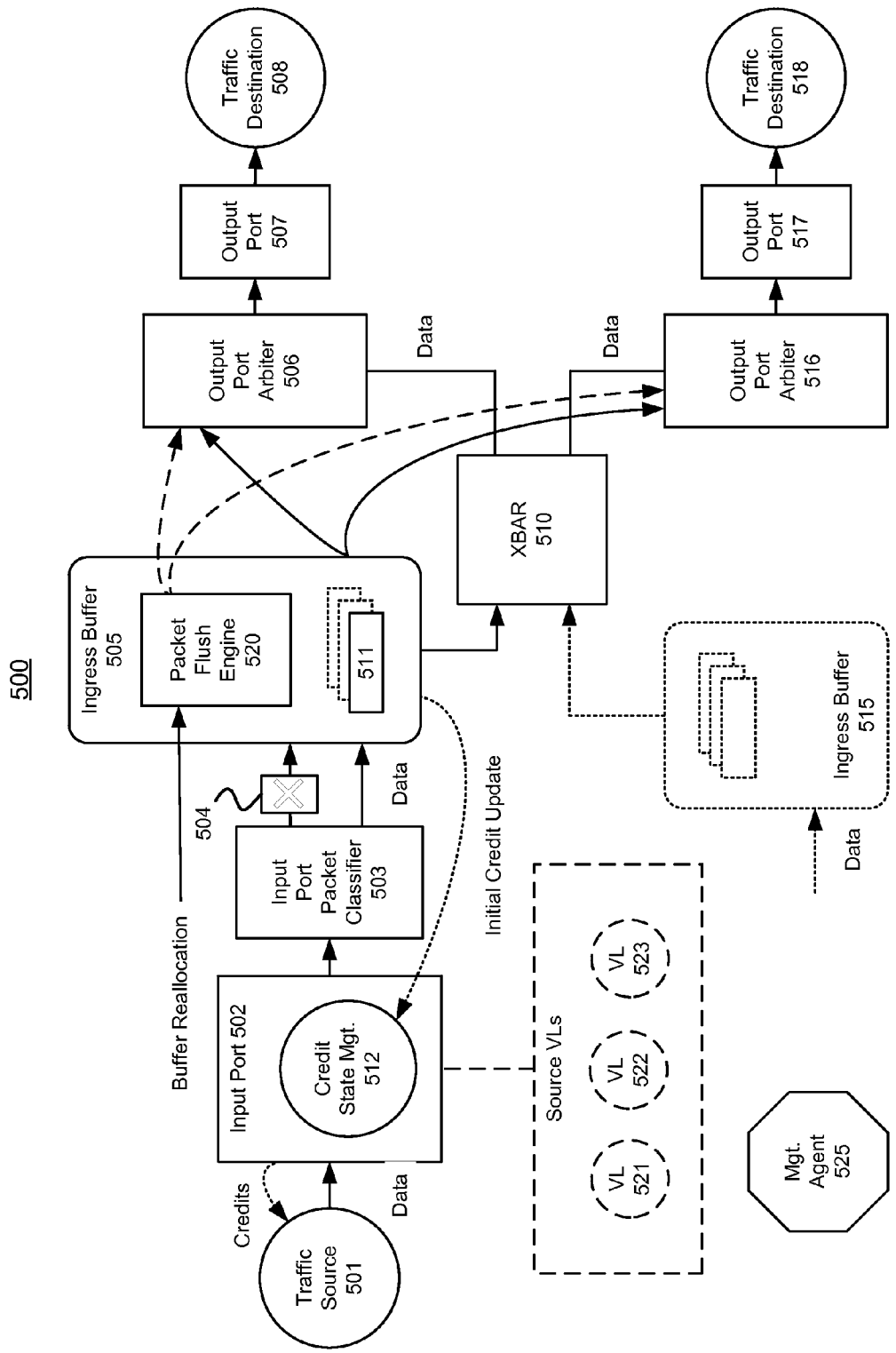
FIG. 5 shows an illustration of supporting buffer reallocation in a high performance system, in accordance with an embodiment of the invention.

FIG. 5 shows an illustration of supporting buffer reallocation in a high performance system, in accordance with an embodiment of the invention. As shown in FIG. 5, an input port 502 can advertise one or more credits to a remote sender, such as a traffic source 501. Then, the input port 502 can receive one or more packets from the remote sender, via different source VLs (e.g. VLs 521-523).

The input port 502 can take advantage of an input packet classifier 503, which can determine one or more destinations (e.g. an output port 507 or 517) for each incoming packet (and can use a port filter 504 to remove one or more packets). Also, the input port 502 can use a credit state management process 512 (i.e. a credit state management unit or block) to maintain the credits that are advertised to the external source on the IB link.

Furthermore, the input port 502 can store the received packets in an ingress buffer 505, which includes a set of VOQs (such as a VOQ 511), before forwarding the packets to the different remote receivers (e.g. the traffic destination 508 and 518), via the crossbar (XBAR) fabric 510. Also, another input port (not shown) can store the received packets in a different ingress buffer 515, which also includes a set of VOQs.

Additionally, each ingress buffer 505 or 515 can maintain different credit states, such as the current buffer occupancy per source VL (which can be defined based on the fullness or emptiness of each buffer), maximum buffers allowed per source VL, a list of current participating VOQs per source VL and their relative queue depths.

In accordance with an embodiment of the invention, the system can support the reallocation and/or repartition of VOQ resources based on the abstraction as described in the previous sections.

In order to provide non-blocking behavior (among the various ports and VLs), the reallocation of the VOQ resources on the input port 502 can be managed in conjunction with all the output schedulers (such as the output port arbiters 506 and 516 that have traffic scheduled from the input port 502).

The reallocation and/or repartition of VOQ resources can occur due to different reasons, such as the changes in the buffering requirements on a per source and/or per destination VL basis and the changes in the needs for an application with respect to its QoS requirements, which may result in more buffers/credits being allocated to a VL at the expense of other VLs.

Additionally, the reallocation and/or repartition of VOQ resources can occur after link state changes. The reallocation and/or repartition of VOQ resources can involve flushing the stale packets out from the VOQs in the event of link state changes. For example, with a new set of operational VLs being negotiated after the link comes back, the old packets may remain in the queue due to a slow drain rate. On the other hand, the application may want to keep the last set of packets before the link goes down, instead of flushing out the stale packets completely.

As shown in FIG. 5, the ingress buffer 505 can advertise an initial credit update to the link credit management process 512 in the physical input port 502. For example, the VOQ 511 can advertise the buffer space available per source VL to the physical input port 502, e.g. when there is an update on the maximum buffer space available per source VL. Then, the link credit management process 512 can keep the advertised maximum allowed value and manages the link credits accordingly.

In accordance with an embodiment of the invention, the initial credit update can be triggered in different scenarios, such as during initialization and after the repartitioning of the buffers is complete. For each case, the link credit management process 512 in the physical input port 502 can be agnostic to the process initiating the update.

When the ingress buffer 505 receives a repartitioning request, which may be initiated by the software and/or firmware, the system can pick a VL, for which the buffer size is reduced. Subsequently, the system can reduce the buffer size associated with the VL, by flushing one or more packets from the head of a VOQ. For example, the system can pick a VOQ, which is associated with the VL on an output port with the highest occupancy (e.g. based on the fullness or emptiness of the queue).

Then, the VOQ can send an initial credit update with the updated value for the updated VLs (including the VLs, for which the buffer size is increased and the VLs, for which the buffer size is reduced). Additionally, if the buffer size associated with a source VL 521-523 exceed its maximum allowed buffer size due to the receipt of one or more packets at any point of time, these packets can be dropped gracefully.

In accordance with an embodiment of the invention, each VOQ can be associated with a packet flush engine 520 that can manage various types of events for handling the packet flushes. When a repartitioning request initiated by the software/firmware is received, the packet flush hardware engine 520 can perform the sequence as illustrated in following List 1.

List 1

```
if (new_buffer_size is >= current_buffer_occupancy) {
    update max_buffers_allowed with the specified new_buffer_size;
    send init credit update with the new value and mark the process as
    completed
} else {
    while (new_buffer_size is < current_buffer_occupancy) {
        choose_a_voq_for_the_given_src_vl( );
        flush_packet_from_head( )
        if the current occupancy drops below the new size exit, else
        continue
        if the current occupancy increases over the new buffer size
    specified due to incoming packets, packets are dropped gracefully
    before the queuing process.
} update max_buffers_allowed with the specified new_buffer_size;
    send initial credit update with the new value and mark the process as
    completed;
}
```

Additionally, the system can provide a management agent 525 that is aware of the different requirements, before and after the changes in the VOQ resources. Thus, the system can ensure that the traffic on most VLs can proceed uninterruptedly, with the loss of only a minimal set of packets.

Figure 6:
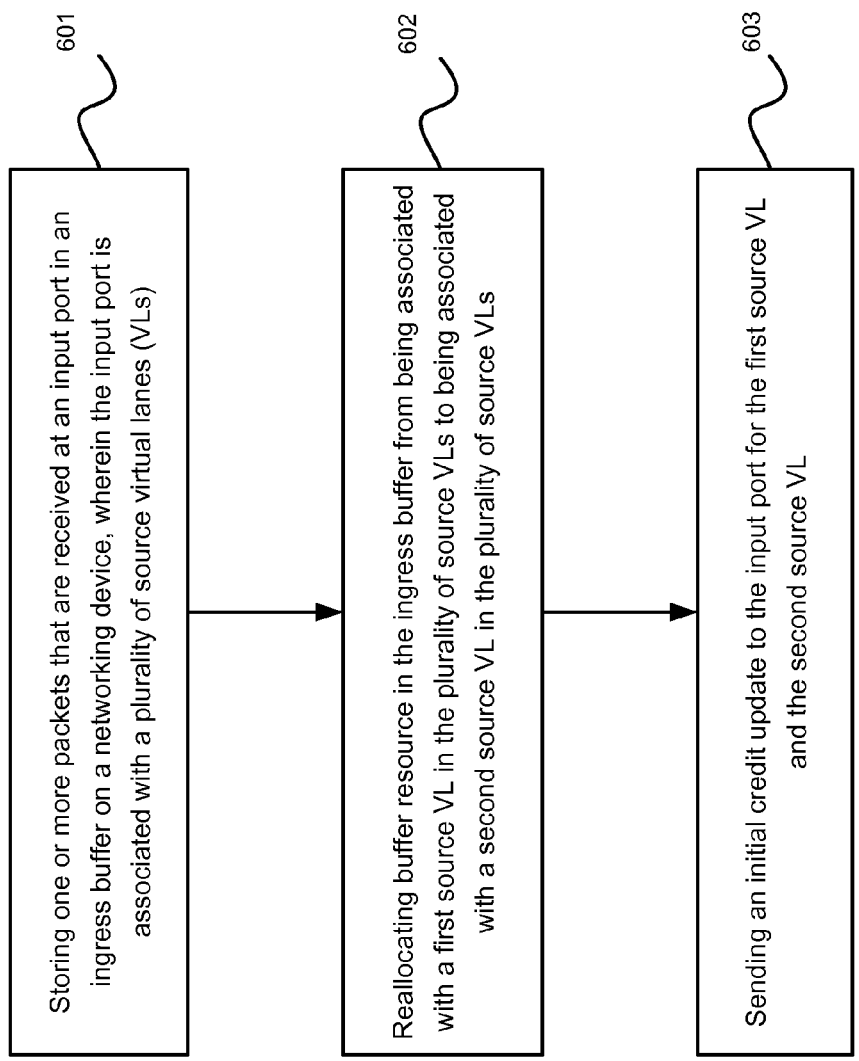
FIG. 6 illustrates an exemplary flow chart for supporting buffer reallocation in a high performance system, in accordance with an embodiment of the invention.

FIG. 6 illustrates an exemplary flow chart for supporting buffer reallocation in a high performance system, in accordance with an embodiment of the invention. As shown in FIG. 6, at step 601, the system can store one or more packets that are received at an input port in an ingress buffer on a networking device, wherein the input port is associated with a plurality of source virtual lanes (VLs). Furthermore, at step 602, the system can reallocate buffer resource in the ingress buffer from being associated with a first source VL in the plurality of source VLs to being associated with a second source VL in the plurality of source VLs. Then, at step 603, the ingress buffer can send an initial credit update to the input port for the first source VL and the second source VL.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting packet switching in a network environment, comprising:
    a networking device comprising a plurality of input ports, a plurality of output ports, and a shared memory;
    an ingress buffer on networking device;
    a plurality of virtual output queues (VOQs) in the ingress buffer, wherein the plurality of VOQs comprise resources of said shared memory and operate to store a plurality of incoming packets that are received at said plurality of input ports and enqueued by the ingress buffer into the plurality of VOQs, wherein the ingress buffer operates to notify one or more schedulers of the plurality of output ports about each of the plurality of incoming packets being enqueued into the plurality of VOQs by announcing a packet arrival event to the one or more schedulers for each of the plurality of incoming packets being enqueued into the plurality of VOQs;
    a plurality of output schedulers wherein each output scheduler is associated with one of said plurality of output ports and maintains a credit state for one or more of the plurality of VOQs; and
    a packet flush engine associated with the ingress buffer, wherein said packet flush engine operates to:
        flush a first selected packet from a VOQ of said plurality of VOQs in the ingress buffer, and
        notify one or more output schedulers of said plurality of output schedulers that the first selected packet is flushed from said VOQ of said plurality of VOQs by announcing a packet flush event to be used by selected ones of the plurality of output schedulers for implementing the credit state as a synchronization of packet flow between the ingress buffer and the plurality of output schedulers.

2. The system according to claim 1, wherein:
    the networking device is a network switch comprising a crossbar fabric.

3. The system according to claim 1, wherein:
    each of the plurality of output schedulers operates to:
        increment a scorecard in accordance with the packet arrival event responsive to the announcing by the ingress buffer of the plurality of incoming packets being enqueued into the plurality of VOCs;
decrement the scorecard responsive to a packet of the plurality of incoming packets being delivered from the ingress buffer to an output port; and
decrement the scorecard in accordance with the packet flush event responsive to the announcing by the packet flush engine of the flushing of the first selected packet.

4. The system according to claim 3, wherein:
each said output scheduler is an output port arbiter, wherein said output port arbiter operates to
schedule the input port to forward a second selected packet to an output port that is associated with said output port arbiter, and
update a scoreboard associated with said output port arbiter.

5. The system according to claim 1, wherein:
said one or more output scheduler operates to update the scoreboard, after receiving a notification from said packet flush engine that the first selected packet is flushed.

6. The system according to claim 1, wherein:
the packet flush engine operates to use a hierarchical process to walk through a linked list of buffers, which store the first selected packet to be flushed, from a head of said virtual output queue.

7. The system according to claim 1, wherein:
the ingress buffer operates to free buffers associated with a multicast packet until the multicast packet is dequeued from every virtual output queue in a destination list for the multicast packet.

8. The system according to claim 1, wherein:
one or more packets stored in said plurality of VOQs in the ingress buffer are flushed in order to handle a link state change at the input port.

9. The system according to claim 1, wherein:
each VOQ of said plurality of VOQs in the ingress buffer is associated with one or more timers, wherein said one or more timers start when a particular packet is inserted to a head of said VOQ.

10. The system according to claim 9, wherein:
the particular packet is flushed if the particular packet is not scheduled to be transmitted to an output port before the timer expires.

11. A method for supporting packet switching in a networking device having a shared memory, a plurality of input ports, and a plurality of output ports, the method comprising:
providing an ingress buffer on the network device;
maintaining a plurality of virtual output queues (VOQs) in the ingress buffer, wherein each VOQ comprises resources of the shared memory;
maintaining with a plurality of output schedulers associated with said plurality of output ports, a credit state for each of the plurality of VOQs;
storing a plurality of incoming packets that are received at an input port and enqueued by the ingress buffer in said plurality of VOQs of the ingress buffer;
notifying by the ingress buffer one or more schedulers of the plurality of output ports about each of the plurality of incoming packets being enqueued into the plurality of VOQs by announcing a packet arrival event to the one or more schedulers for each of the plurality of incoming packets being enqueued into the plurality of VOQs;
flushing, via a packet flush engine associated with the ingress buffer, a first selected packet that is stored in a VOQ of said plurality of VOQs in the ingress buffer; and
notifying, with the packet flush engine, one or more of said plurality of output schedulers that the first selected packet is flushed from said VOQ of said plurality of VOQs by announcing a packet flush event to be used by selected ones of the plurality of output schedulers for implementing the credit state as a synchronization of packet flow between the ingress buffer and the plurality of output schedulers.

12. The method according to claim 11,
wherein the networking device is a network switch comprising a crossbar fabric.

13. The method according to claim 11, further comprising:
incrementinq a scorecard of an output scheduler in accordance with the packet arrival event responsive to the announcing by the ingress buffer of the plurality of incoming packets being enqueued into the plurality of VOCs;
decrementinq the scorecard responsive to a packet of the plurality of incoming packets being delivered from the ingress buffer to an output port; and
decrementinq the scorecard in accordance with the packet flush event responsive to the announcing by the packet flush engine of the flushing of the first selected packet.

14. The method according to claim 13, further comprising:
allowing each of said plurality of output schedulers to be an output port arbiter, wherein said output port arbiter operates to:
schedule the input port to forward a second selected packet to an output port that is associated with said output port arbiter, and
update a scoreboard associated with said output port arbiter.

15. The method according to claim 11, further comprising:
updating, via each of said plurality of output schedulers, the scoreboard after receiving a notification from said packet flush engine that the first selected packet is flushed.

16. The method according to claim 11, further comprising:
using, via the packet flush engine, a hierarchical process to walk through a linked list of buffers, which store the first selected packet to be flushed, from a head of a VOQ of said plurality of VOQs.

17. The method according to claim 11, further comprising:
allowing buffers associated with a multicast packet to be freed until the multicast packet is dequeued from every VOQ in a destination list for the multicast packet.

18. The method according to claim 11, further comprising:
flushing one or more packets stored in the ingress buffer in order to handle a link state change at input port of said plurality of input ports.

19. The method according to claim 11, further comprising:
associating one or more timers with each VOQ in the ingress buffer, wherein
said one or more timers start when a particular packet is inserted into a head of a said VOQ, and the particular packet is flushed by the packet flush engine if the particular packet is not scheduled to be transmitted to an output port before the timer expires.

20. A non-transitory machine readable storage medium having instructions stored thereon for supporting packet switching in a networking device having a shared memory and a plurality of input ports and a plurality of output ports, which instructions, when executed, cause the network device to perform steps comprising:

providing an ingress buffer on the network device;

maintaining a plurality of virtual output queues (VOQs) in the ingress buffer, wherein each VOQ comprises resources of the shared memory;

maintaining with a plurality of output schedulers associated with said plurality of output ports, a credit state for each of the plurality of VOQs;

storing a plurality of incoming packets that are received at an input port and enqueued by the ingress buffer in said plurality of VOQs of the ingress buffer;

notifying by the ingress buffer one or more schedulers of the plurality of output ports about each of the plurality of incoming packets being enqueued into the plurality of VOQs by announcing a packet arrival event to the one or more schedulers for each of the plurality of incoming packets being enqueued into the plurality of VOQs;

flushing, via a packet flush engine associated with the ingress buffer, a first selected packet that is stored in a VOQ of said plurality of VOQs in the ingress buffer; and notifying, with the packet flush engine, one or more of said plurality of output schedulers that the first selected packet is flushed from said VOQ of said plurality of VOQs by announcing a packet flush event to be used by selected ones of the plurality of output schedulers for implementing the credit state as a synchronization of packet flow between the ingress buffer and the plurality of output schedulers.

\* \* \* \* \*

UNITED STATES PATENT AND TRADEMARK OFFICE
CERTIFICATE OF CORRECTION

PATENT NO. : 9,832,143 B2
APPLICATION NO. : 14/584831
DATED : November 28, 2017
INVENTOR(S) : Srinivasan et al.

It is certified that error appears in the above-identified patent and that said Letters Patent is hereby corrected as shown below:

In the Claims

In Column 11, Line 2, in Claim 3, delete "VOCs;" and insert -- VOQs; --, therefor.

In Column 12, Line 19, in Claim 13, delete "incrementinq" and insert -- incrementing --, therefor.

In Column 12, Line 23, in Claim 13, delete "VOCs;" and insert -- VOQs; --, therefor.

In Column 12, Line 24, in Claim 13, delete "decrementinq" and insert -- decrementing --, therefor.

In Column 12, Line 27, in Claim 13, delete "decrementinq" and insert -- decrementing --, therefor.

Signed and Sealed this
Twenty-third Day of October, 2018

Andrei Iancu
*Director of the United States Patent and Trademark Office*